US010621180B2

(12) United States Patent
Patthak et al.

(10) Patent No.: US 10,621,180 B2
(45) Date of Patent: Apr. 14, 2020

(54) ATTRIBUTE-BASED DETECTION OF ANOMALOUS RELATIONAL DATABASE QUERIES

(71) Applicant: Oracle International Corporation, Redwood Shores, CA (US)

(72) Inventors: Anindya Chandra Patthak, San Jose, CA (US); Joydip Kundu, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 209 days.

(21) Appl. No.: 15/721,790

(22) Filed: Sep. 30, 2017

(65) Prior Publication Data

US 2019/0102437 A1 Apr. 4, 2019

(51) Int. Cl.
*G06F 16/00* (2019.01)
*G06F 16/2457* (2019.01)
*G06F 16/28* (2019.01)
*G06F 16/2458* (2019.01)
*G06F 16/33* (2019.01)
*G06F 16/2453* (2019.01)

(52) U.S. Cl.
CPC ...... *G06F 16/2457* (2019.01); *G06F 16/2453* (2019.01); *G06F 16/2458* (2019.01); *G06F 16/284* (2019.01); *G06F 16/3344* (2019.01)

(58) Field of Classification Search
CPC .................................................. G06F 16/2457
USPC .......................................................... 707/705
See application file for complete search history.

(56) References Cited

U.S. PATENT DOCUMENTS

| | | | |
|---|---|---|---|
| 2011/0271146 A1* | 11/2011 | Mork | G06F 16/2453 714/37 |
| 2012/0041901 A1* | 2/2012 | Zhao | G06N 5/043 706/10 |
| 2015/0286819 A1* | 10/2015 | Coden | G06F 21/552 726/23 |
| 2016/0239536 A1* | 8/2016 | Honma | G01C 21/3605 |
| 2018/0260447 A1* | 9/2018 | Bergman | G06F 17/2705 |

* cited by examiner

*Primary Examiner* — Chelcie L Daye
(74) *Attorney, Agent, or Firm* — Invoke

(57) ABSTRACT

Techniques for detecting an anomaly in queries of a relational database are disclosed. The techniques include obtaining a set of semantic attributes for a query of a relational database. The semantic attributes are then used to calculate a set of similarities between the query and a set of non-anomalous queries of the relational database. When a highest similarity in the set of similarities does not meet a similarity threshold, an indication that the query is anomalous is outputted.

18 Claims, 5 Drawing Sheets

ATTRIBUTE-BASED DETECTION OF ANOMALOUS RELATIONAL DATABASE QUERIES

TECHNICAL FIELD

The present disclosure relates to relational databases. In particular, the present disclosure relates to techniques for performing attribute-based detection of anomalous relational database queries.

BACKGROUND

Relational database management systems (RDBMS) typically interface with applications using a dialect of Structured Query Language (SQL). For example, an application may use SQL as a data manipulation language (DML) for adding, deleting, selecting, and/or updating records in a relational database. The application may also use SQL as a data definition language (DDL), which enables the creation, update, and deletion of tables and/or columns in the relational database. Because both DML and DDL queries can be used by malicious users to access and/or manipulate sensitive information, relational database security may be improved by detecting and responding to anomalous relational database queries that do not conform to common or legitimate database access patterns.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DETECTING ANOMALIES IN RELATIONAL DATABASE QUERIES
4. EXAMPLE EMBODIMENT
5. FREQUENCY-BASED ANOMALY DETECTION IN RELATIONAL DATABASE QUERIES
6. ATTRIBUTE-BASED ANOMALY DETECTION IN RELATIONAL DATABASE QUERIES
7. COMPUTER NETWORKS AND CLOUD NETWORKS
8. MISCELLANEOUS; EXTENSIONS
9. HARDWARE OVERVIEW

1. General Overview

Techniques for detecting an anomaly in queries of a relational database are disclosed. The techniques include obtaining a set of semantic attributes for a query of a relational database. The semantic attributes are then used to calculate a set of similarities between the query and a set of non-anomalous queries of the relational database. When a highest similarity in the set of similarities does not meet a similarity threshold, an indication that the query is anomalous is outputted.

One or more embodiments described in this Specification and/or recited in the claims may not be included in this General Overview section.

2. Architectural Overview

Figure 1:
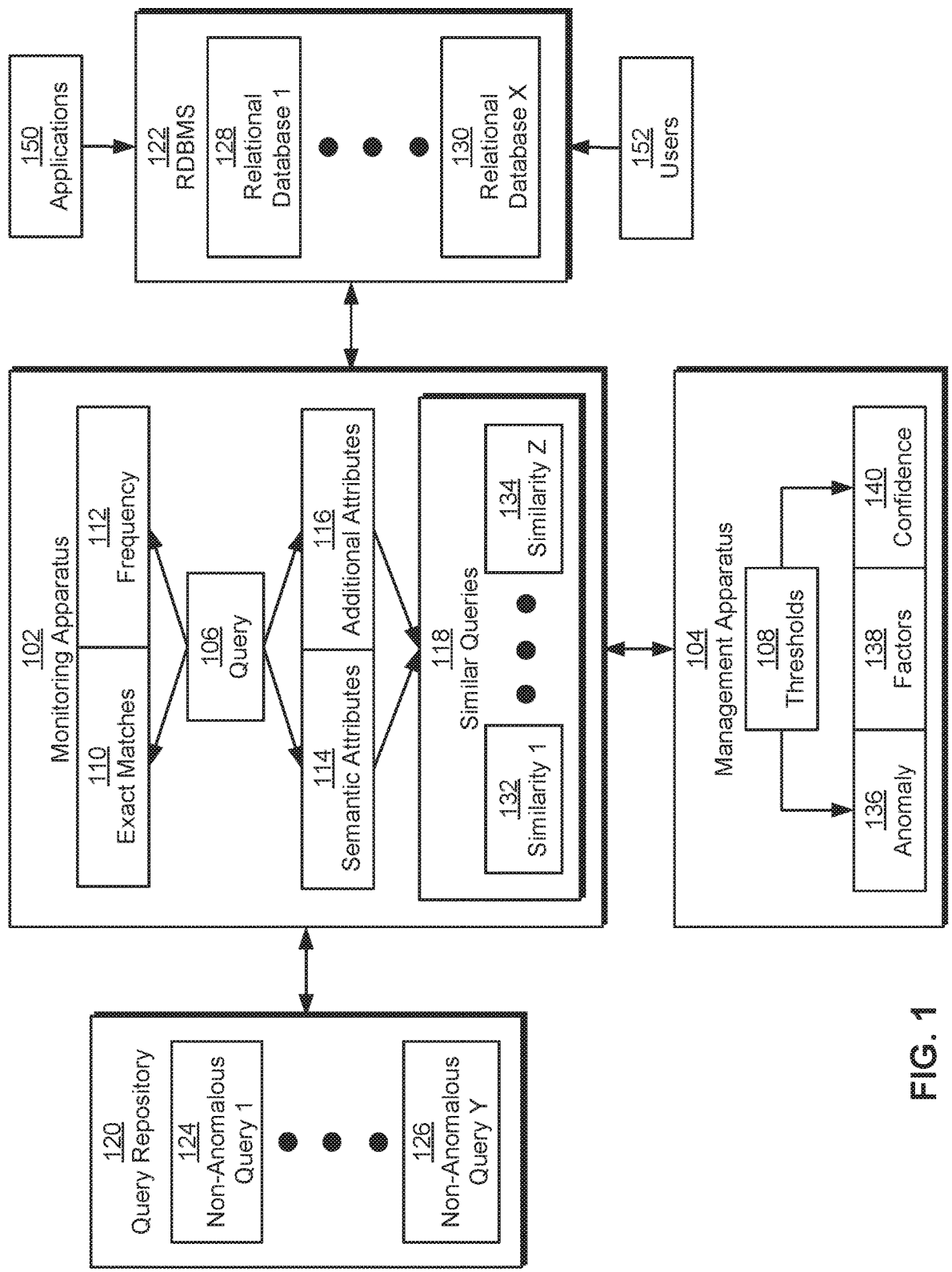
FIG. 1 illustrates a system in accordance with one or more embodiments.

FIG. 1 illustrates a system in accordance with one or more embodiments. As illustrated in FIG. 1, the system includes a monitoring apparatus 102 and a management apparatus 104.

Monitoring apparatus 102 and management apparatus 104 may be used to detect anomalies in queries of one or more relational databases (e.g., relational database 1 128, relational database x 130) that are managed and/or maintained using a relational database management system (RDBMS) 122. For example, RDBMS 122 may allow applications 150 and/or users 152 to create, modify, define, and/or update the relational databases using Structured Query Language (SQL) queries.

Monitoring apparatus 102 may analyze a given query 106 received by RDBMS 122 for an anomaly 136 by comparing query 106 to a set of non-anomalous queries (e.g., non-anomalous query 1 124, non-anomalous query y 126) in a query repository 120. For example, the non-anomalous queries may include historic queries that are generated during normal use of RDBMS 122 by applications 150 and/or users 152. The non-anomalous queries may also, or instead, include a whitelist of legitimate queries provided by a developer and/or administrator associated with RDBMS 122. The non-anomalous queries may be aggregated from RDBMS 122, applications 150, and/or users 152 and stored in a database, data warehouse, filesystem, cloud storage, and/or another data-storage mechanism provided by query repository 120 for subsequent retrieval and use.

In turn, management apparatus 104 may generate output related to anomalies in relational database queries that are detected by monitoring apparatus 102. For example, management apparatus 104 may generate notifications, alerts, log files, and/or other output indicating anomalies (e.g., anomaly 136) in queries (e.g., query 106) of RDMBS 122. Management apparatus 104 may also include one or more factors 136 associated with identifying the query as anomalous and/or a confidence 136 in identifying the query as anomalous.

In one or more embodiments, the system may include more or fewer components than the components illustrated in FIG. 1. For example, monitoring apparatus 102 and management apparatus 104 may be implemented together and/or separately using one or more hardware and/or software components. Such components may include, but are not limited to, relational database audit logs, session histories, application servers, database firewalls, and/or other mechanisms for analyzing relational database queries on a real-time, near-real-time, and/or offline basis. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. For example, the data repository may include query repository 120 and/or RDBMS 22. Further, the data repository may include multiple different storage units and/or devices. The multiple different storage units and/or devices may or may not be of the same type or located at the same physical site. The data repository may be implemented or may execute on the same computing system as monitoring apparatus 102 and/or management apparatus 104 or on a computing system that is separate from monitoring apparatus 102 and/or management apparatus 104. The data repository may be communicatively coupled to monitoring apparatus 102 and/or management apparatus 104 via a direct connection or via a network.

In one or more embodiments, monitoring apparatus 102 and/or management apparatus 104 include hardware and/or software configured to perform operations described herein for detecting anomalies in relational database queries. Examples of such operations are described below.

In an embodiment, the system of FIG. 1 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Detecting Anomalies in Relational Database Queries

In one or more embodiments, the system of FIG. 1 includes functionality to perform attribute-based detection of anomalous relational database queries. As mentioned above, monitoring apparatus 102 may compare a given query 106 to a number of non-anomalous queries in query repository 120 to determine if query 106 contains anomaly 136 or not.

As shown in FIG. 1, the comparisons may include identifying exact matches 110 between query 106 and the non-anomalous queries. For example, monitoring apparatus 102 may calculate a checksum, message digest, and/or hash value from query 106 and compare the calculated value with corresponding values calculated from non-anomalous queries in query repository 120. If the calculated value matches one or more corresponding values, one or more exact matches 110 may be found between query 106 and the non-anomalous queries. In other words, monitoring apparatus 102 may identify exact matches 110 when the syntax of query 106 exactly matches that of one or more non-anomalous queries.

If exact matches 110 are found between query 106 and the non-anomalous queries, monitoring apparatus 102 may determine a frequency 112 associated with exact matches 110. For example, monitoring apparatus 102 may obtain frequency 112 as the number of exact matches 110 found for query 106 and/or the number of times query 106 has been made over a given period (e.g., a week, a month, a year, the beginning of time, etc.).

To determine if a recurring query 106 (e.g., a query that has exact matches 110) is anomalous, monitoring apparatus 102, management apparatus 104, and/or another component of the system may compare frequency 112 to one or more thresholds 108 associated with frequency 112. The comparison may be performed to determine if query 106 is frequent enough to be considered non-anomalous. For example, the component may calculate a percentile associated with frequency 112 based on a distribution of query frequencies for one or more relational databases in RDBMS 122. If the percentile does not meet a threshold (e.g., if the percentile represents the lowest 1-2% of query frequencies), the component may determine that query 106 contains anomaly 136. If the percentile meets the threshold, the component may determine that query 106 is not anomalous. In another example, the component may compare frequency 112 with a threshold representing a minimum number of occurrences of a query. If frequency falls below the threshold, the component may identify query 106 as non-anomalous.

If exact matches 110 are not found between query 106 and any non-anomalous queries, monitoring apparatus 102 may compare semantic attributes 114 and/or additional attributes 116 of query 106 with those of the non-anomalous queries. Semantic attributes 114 may include coarse-grained semantic features of query 106. For example, semantic attributes 114 for data manipulation language (DML) queries of RDBMS 122 may include database instances, tables, columns, and/or query options (e.g., a select all option.) in the queries. In another example, semantic attributes 114 for data definition language (DDL) queries of RDBMS 122 may include database instances, users, roles, privileges, and/or grant options (e.g., a grant all privileges option, a "with admin" option, etc.) in the queries. In other words, semantic attributes 114 may capture the intended effect of query 106, independently of the structure or syntax of query 106.

Additional attributes 116 may describe the context in which query 106 is executed. For example, additional attributes 116 may identify a time of query 106, a source of query 106 (e.g., application, host, network address, etc.), a user performing query 106, and/or one or more privileges associated with the user.

Monitoring apparatus 102 may use semantic attributes 114 and/or additional attributes 116 to identify, from a larger set of non-anomalous queries in query repository 120, a set of similar queries 118 to query 106. For example, monitoring apparatus 102 may use a locality-sensitive hashing technique to match query 106 to a subset of non-anomalous queries with similar semantic attributes 114 and/or additional attributes 116. If query 106 does not have any similar queries 118, monitoring apparatus 102 may identify anomaly 136 in query 106.

If similar queries 118 are found for query 106, monitoring apparatus 102 may calculate a similarity (e.g., similarity 1 132, similarity z 134) between query 106 and each similar query. For example, monitoring apparatus 102 may use vector representations of semantic attributes 114 and/or additional attributes 116 to calculate a Euclidean distance, cosine similarity, Hamming distance, and/or other measure of similarity between query 106 and each query in similar queries 118. Identifying similar queries 118 and calculating similarities between query 106 and similar queries 118 is described in further detail below with respect to FIG. 2.

After similarities are calculated between query 106 and similar queries 118, monitoring apparatus 102, management apparatus 104, and/or another component of the system may compare the similarities to one or more thresholds 108 to determine if query 106 is anomalous or not. For example, the component may compare the highest similarity found between query 106 and a similar query to a similarity threshold. If the highest similarity does not meet the similarity threshold (i.e., if query 106 is not similar enough to any non-anomalous queries), the component may set a flag and/or generate other output indicating anomaly 136 in query 106. If the highest similarity meets the similarity threshold, the component may determine that query 106 is not anomalous.

The component may also include frequency 112 in the detection of anomaly 136 based on a comparison of query 106 with similar queries 118. For example, frequency 112 may be obtained from one or more similar queries 118 (e.g., one or more of the most similar queries) and used to adjust thresholds 108. As a result, one or more similar queries with high frequency 112 may be used to lower the similarity threshold and/or another threshold used to detect anomaly 136, while multiple similar queries with low frequency 112 may cause an increase in the threshold(s). Query 106 may thus be identified as non-anomalous if one or more similar queries have sufficiently high frequency 112 and as anomalous if all highly similar queries 118 are low frequency 112. In other words, the system may use multidimensional attributes (e.g., similarity, frequency 112, etc.) to perform anomaly detection in queries of RDBMS 122.

When a given query 106 is identified as anomalous, management apparatus 104 may output an indication of anomaly 136 for query 106. For example, management apparatus 104 may generate an email, notification, alert, message, log entry, and/or other communication or output containing the indication. The output may be provided and/or transmitted to an administrator, developer, and/or other user associated with monitoring and managing queries and/or anomalies in RDBMS 122.

Management apparatus 104 may also output one or more factors 138 associated with anomaly 136. For example, management apparatus 104 may identify differences between attributes (e.g., semantic attributes 114 and/or additional attributes 116) of query 106 and those of non-anomalous queries as factors 138 contributing to the identification of anomaly 136 in query 106. In another example, management apparatus 104 may identify a low frequency 112 as the reason for identifying anomaly 136 in a recurring query 106.

Management apparatus 104 may additionally output a confidence 140 associated with identifying anomaly 136 in query 106. For example, management apparatus 104 and/or another component of the system may calculate a confidence score based on the amount by which a given threshold (e.g., frequency threshold, similarity threshold, etc.) is not met by query 106. The confidence score may be included with the outputted indication of anomaly 136 and/or factors 138 to further facilitate assessment and/or management of anomalous relational database queries.

Management apparatus 104 and/or another component of the system may perform additional actions based on anomaly 136, factors 138, and/or confidence 140. For example, the component may block execution of an anomalous query if confidence 140 exceeds a threshold and/or the query is used to access sensitive data or make significant and/or unusual changes to database tables, instances, and/or privileges. In another example, the component may obtain user feedback related to queries identified as anomalous by the system. The user feedback may identify non-anomalous queries that were previously identified as anomalous by the system. In turn, the identified queries may be used to populate a whitelist, and any subsequent queries that are found in the whitelist may be omitted from notifications and/or other output related to anomalous queries to RDBMS 122.

By performing initial anomaly detection based on exact matches 110 and frequency 112, the system of FIG. 1 may quickly omit common, non-anomalous queries from further analysis while flagging infrequent queries that can be legitimate but should still be considered sensitive or noteworthy. For example, the component may flag, as anomalous, infrequent queries that retrieve version information from RDBMS 122, even if such queries are occasionally performed by applications 150 for legitimate reasons.

Subsequent analysis of similarities in semantic attributes 114 and/or additional attributes 116 between queries and similar queries 118 may further allow the system to identify anomalies in a more flexible and/or adaptive manner than conventional techniques that perform anomaly detection using user-written rules and/or syntax-based query analysis. For example, the system may avoid identifying a query as anomalous when the query produces the same effect as a non-anomalous query but has a slightly different syntax (e.g., to improve performance). On the other hand, the query may be incorrectly flagged as anomalous by a syntax-based anomaly detection technique (e.g., because the query differs in syntax from the non-anomalous query) and/or a rules-based anomaly detection technique (e.g., because the rules do not describe all possible correct access paths to RDBMS 122). Consequently, the system of FIG. 1 may improve the use of relational databases and the detection of anomalous queries of relational databases.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Figure 2:
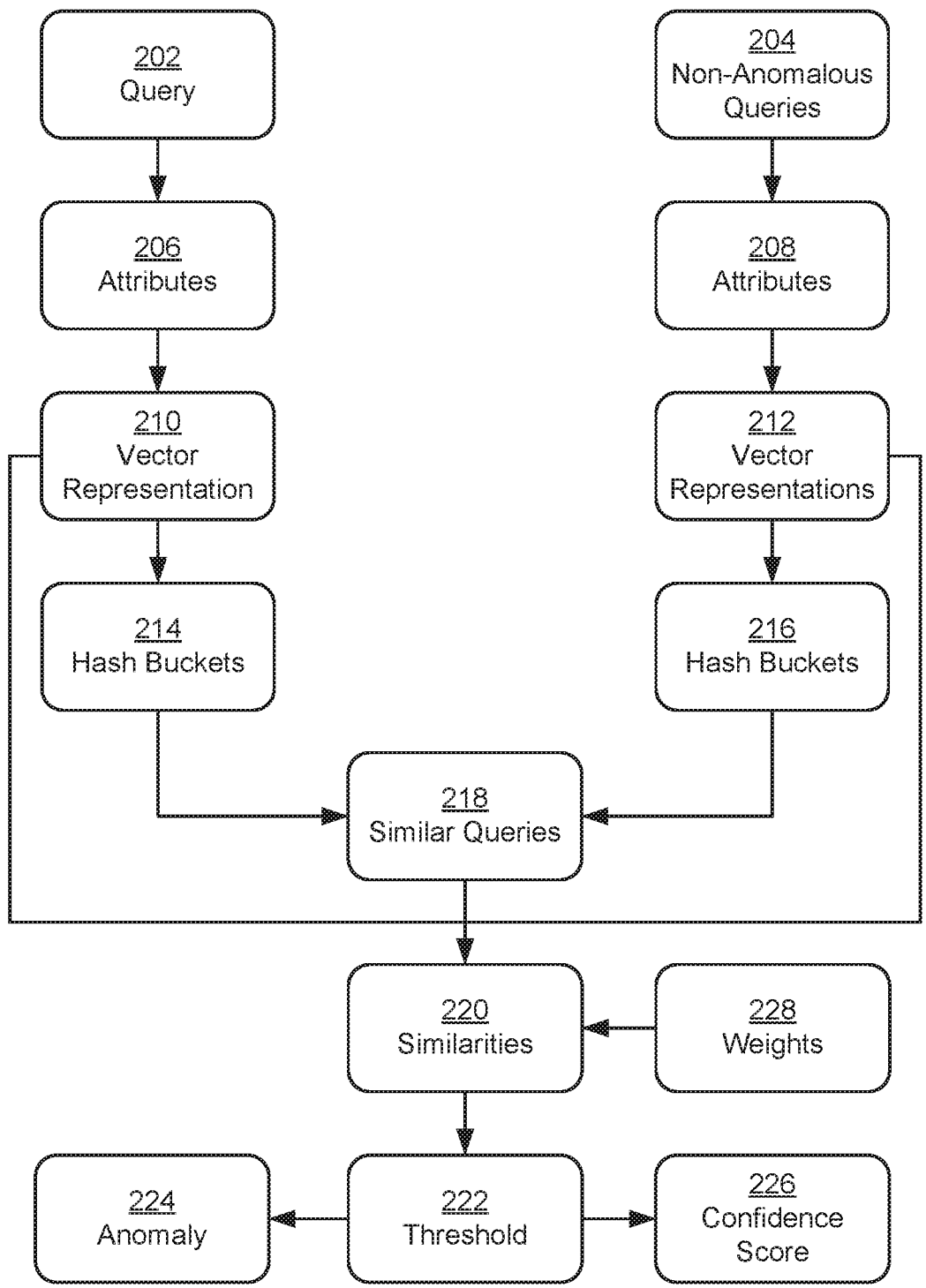
FIG. 2 illustrates an exemplary detection of an anomaly in a relational database query in accordance with one or more embodiments.

FIG. 2 illustrates an exemplary detection of an anomaly 224 in a relational database query 202 in accordance with one or more embodiments. More specifically, FIG. 2 shows an exemplary technique for performing attribute-based detection of anomaly 224 in query 202.

As mentioned above, attribute-based detection of anomaly 224 may be performed after query 202 fails to exactly match any non-anomalous queries. As a result, query 202 may be compared to a "positive" set of non-anomalous queries 204 based on similarities 220 between attributes 206-208 of the queries, which may include semantic attributes and/or additional non-semantic attributes.

For example, a DML query may be parsed to extract one or more of the following semantic attributes:
- a query type;
- table names in the query;
- column names selected in the query;
- column names subject to "WHERE" clauses in the query;
- a Boolean indicating if a "select all" option (e.g., "SELECT *" in SQL) is used in the query; and
- the number of tokens (e.g., words) in the query.

An exemplary DML query may have the following form:
SELECT J.JOB_ID, TARGET_LIST_INDEX, E.JOB_TYPE_ID FROM MGMT_JOB_EXEC_SUMMARY E, MGMT_JOB J WHERE EXECUTION_ID=:B1 AND J.JOB_ID=E.JOB_ID In turn, the following attributes may be extracted from the exemplary DML query:
- query type: SELECT
- tables: {MGMT_JOB, MGMT_JOB_EXEC_SUMMARY}
- selected columns: {J.JOB_ID, TARGET_LIST_INDEX E.JOB_TYPE_ID}
- columns subject to "WHERE" clauses: {EXECUTION_ID, J.JOB_ID, E.JOB_ID}
- "select all" option: FALSE
- number of tokens: 15

In another example, a DDL query may be parsed to extract one or more of the following attributes:
- a query type;
- users, roles, or other grantees in the query;
- privileges granted in the query;
- a Boolean indicating if a "grant" query is issued with "all privileges" option; and
- a Boolean indicating if a "grant" query is issued with a "with admin" option.

An exemplary DDL query may have the following form:
GRANT ALTER DATABASE TO dw_manager WITH ADMIN OPTION As a result, the following attributes may be extracted from the exemplary DDL query:
- query type: GRANT
- grantees: {dw_manager}
- privileges: {ALTER}
- "all privileges" option: FALSE
- "with admin" option: TRUE In both examples, semantic attributes extracted from the queries may be accompanied by additional non-semantic attributes. For example, one or both queries may include attributes such as the time, day, and/or month of the query; the user performing the query; one or more privileges associated with the user; and/or an application, Internet Protocol (IP) address, and/or host from which the query originated.

Next, attributes 206 of query 202 may be converted into a vector representation 210, and attributes 208 of non-anomalous queries 206 may be converted into a set of vector representations 212. For example, a dictionary may be used to map between strings representing attributes 206-208 to numeric (e.g., integer) encodings of the strings, and an encoded numeric value representing each attribute may be included in a vector representation of the corresponding query.

Thus, exemplary attributes of a DML query above may be encoded into a vector representation that contains the following:
- one element representing the query type;
- one or more elements representing table names in the query, up to an optional pre-specified limit;
- one or more elements representing column names selected in the query, up to an optional pre-specified limit;
- one or more elements representing column names subject to "WHERE" clauses in the query, up to an optional pre-specified limit;
- one element (e.g., a Boolean) indicating if a "select all" option (e.g., "SELECT *" in SQL) is used in the query; and
- one element indicating the number of tokens (e.g., words) in the query.

Similarly, exemplary attributes of a DDL query may be encoded into a vector representation that contains the following:
- one element representing the query type;
- one or more elements representing users, roles, or other grantees, up to an optional pre-specified limit;
- one or more elements representing privileges granted in the query, up to an optional pre-specified limit;
- one element (e.g., a Boolean) indicating if a "grant" query is issued with "all privileges" option; and
- one element (e.g., a Boolean) indicating if a "grant" query is issued with a "with admin" option.

Vector representation 210 may then be mapped to one or more hash buckets 214, which are compared to hash buckets 216 to which vector representations 212 are mapped. For example, a locality-sensitive hashing technique may be used to map vector representations 212 of attributes 208 to a set of hash buckets 216 using the following exemplary pseudocode:

---

Input: A set of (integer) vectors P = {p} in d dimensions
Output: Hash tables T1,...,Tk
1. For each hash table T1, ..., Tk, generate a set of size n random hyperplanes in d dimensions
2. For each i in 1, ..., k,
   a. For each j in 1, ..., n and for each p in P
   Get an n bit integer t by taking dot product of p and jth hyperplane
   b. Store point p in bucket t of Ti

---

In the above pseudocode, input vectors "P" represent vector representations 212 of fixed dimension "d" that are mapped and stored in hash buckets 216 of "k" hash tables. Each hash bucket for a given hash table may be identified using an "n" bit integer, with each bit "j" in the integer representing the sign (e.g., positive or non-positive) of the dot product of a given vector representation "p" in "P" with the "jth" hyperplane. After query 202 is received, the same hyperplanes may be used to map vector representation 210 of attributes 206 to a different set of hash buckets 214, which may be a subset of hash buckets 216.

Overlap between hash buckets 214 and hash buckets 216 may then be used to identify, from a larger set of non-anomalous queries 206, a set of similar queries 218 to query 202. Continuing with the previous example, a subset of vector representations 212 representing similar queries 218 may be obtained from hash buckets 214 to which vector representation 210 maps using the following exemplary pseudocode:

```
Input: A query (integer) vector q in d dimensions
Output: k (=1) nearest neighbor to q or nil if there in none
    0. S <- emptySet;
    1. For each i in 1,...k,
        a. S <-S U bucket t in Ti, where t is the n-bit integer by taking
           dot product of q and set of hyperplanes
        b. Return the k closest neighbors of q from set S
```

In the above pseudocode, an input vector "q" denotes vector representation 210 of the same dimension "d" as vector representations 212. The same set of random hyperplanes used to populate hash buckets 216 in "k" hash tables may be combined with "q" to identify a set S of hash buckets 214 in the same hash tables and obtain one or more vector representations 212 in the identified hash buckets 214. If all hash buckets 214 are empty, no similar queries 218 may be found for query 202.

In another example, a set of random linear transformations may be applied to variable-length vector representations 212 of attributes 208 (e.g., queries with different numbers of tables, columns, grantees, privileges, etc.) to generate a constant dimensional signature for each of non-anomalous queries 204. The constant dimensional signatures of non-anomalous queries 204 may be used as input to hash functions that map the queries into one or more hash buckets 216, and vector representations 212 of non-anomalous queries 204 may be stored in the corresponding hash bucket(s). After query 202 is received, the same transformations may be applied to vector representation 210 to generate a signature that is used to identify one or more hash buckets 214 to which vector representation 210 maps and obtain zero or more vector representations 212 of similar queries 218 from hash buckets 214.

After similar queries 218 are identified, vector representation 210 may be compared to the subset of vector representations 212 for similar queries 218 to calculate a set of similarities 220 between query 202 and similar queries 218. For example, each element of vector representation 210 may be compared with a corresponding element in a vector representation for a similar query. If the elements are the same, a corresponding element of an output vector may be set to 0. If the elements differ, the corresponding element may be set to 1. In another example, a cosine similarity, Jaccard similarity, Euclidean distance, and/or another measure of similarity between two vectors and/or sets.

A set of weights 228 may additionally be applied to the compared vector representations to calculate similarities 220. Each weight may represent the relative importance of the corresponding vector element and/or attribute in detecting anomaly 224 in query 202. For example, a weight for a table name may be higher than a weight for a column name to reflect the higher risk associated with accessing a new table instead of a new column in a previously accessed table. Thus, a weight vector of <10, 20, 30, 10> may be applied to two four-dimensional vectors of <2, 3, 4, 5> and <2, 7, 5, 5> to obtain a similarity of 10*0+20*1+30*1+10*0, or 50.

A threshold 222 is then applied to similarities 220 to determine if anomaly 224 is found in query 202 and/or calculate a confidence score 226 associated with a detected anomaly 224 in query 202. For example, similarities 220 may be compared to a similarity threshold 222 to determine if query 202 differs enough from non-anomalous queries 204 to be anomalous. If similarity threshold 222 is met by one or more similarities 220 (e.g., if query 202 is similar enough to one or more similar queries 218), anomaly 224 may be deemed absent from query 202.

If threshold 222 is not met by one or similarities 220 and/or no similar queries 218 are found for query 202, anomaly 224 may be detected, and confidence score 226 may be calculated based on the extent to which threshold 222 is not met. For example, confidence score 226 may have a value that ranges from 0 to 1, with a lower value representing lower confidence in anomaly 224 and a higher value representing higher confidence in anomaly 224. Confidence score 226 may thus be set to 1 or close to 1 if query 202 does not have any similar queries 218 and/or similarities 220 between query 202 and any similar queries 218 are very low compared to threshold 222. Conversely, confidence score may be calculated to be linearly proportionate to the difference between the highest similarity and threshold 222 if the highest similarity is relatively close to threshold 222 but does not quite meet threshold 222.

Weights 228, thresholds (e.g., threshold 222), and/or other parameters used to detect anomaly 224 and/or calculate confidence score 226 may additionally be tuned to accommodate other constraints or goals related to anomaly detection in queries. For example, different attributes 206-208 may be selected for inclusion in vector representations 210-212 and/or weights 228 may be adjusted to reflect varying levels of risk associated with different types of database accesses. In another example, weights 228, threshold 222, frequency thresholds, vector representations 210-212, and/or other components used to identify anomaly 224 and/or calculate confidence score 226 may be selected based on a tolerance of the anomaly detection system to false positives and/or computational or memory constraints.

5. Frequency-Based Anomaly Detection in Relational Database Queries

Figure 3:
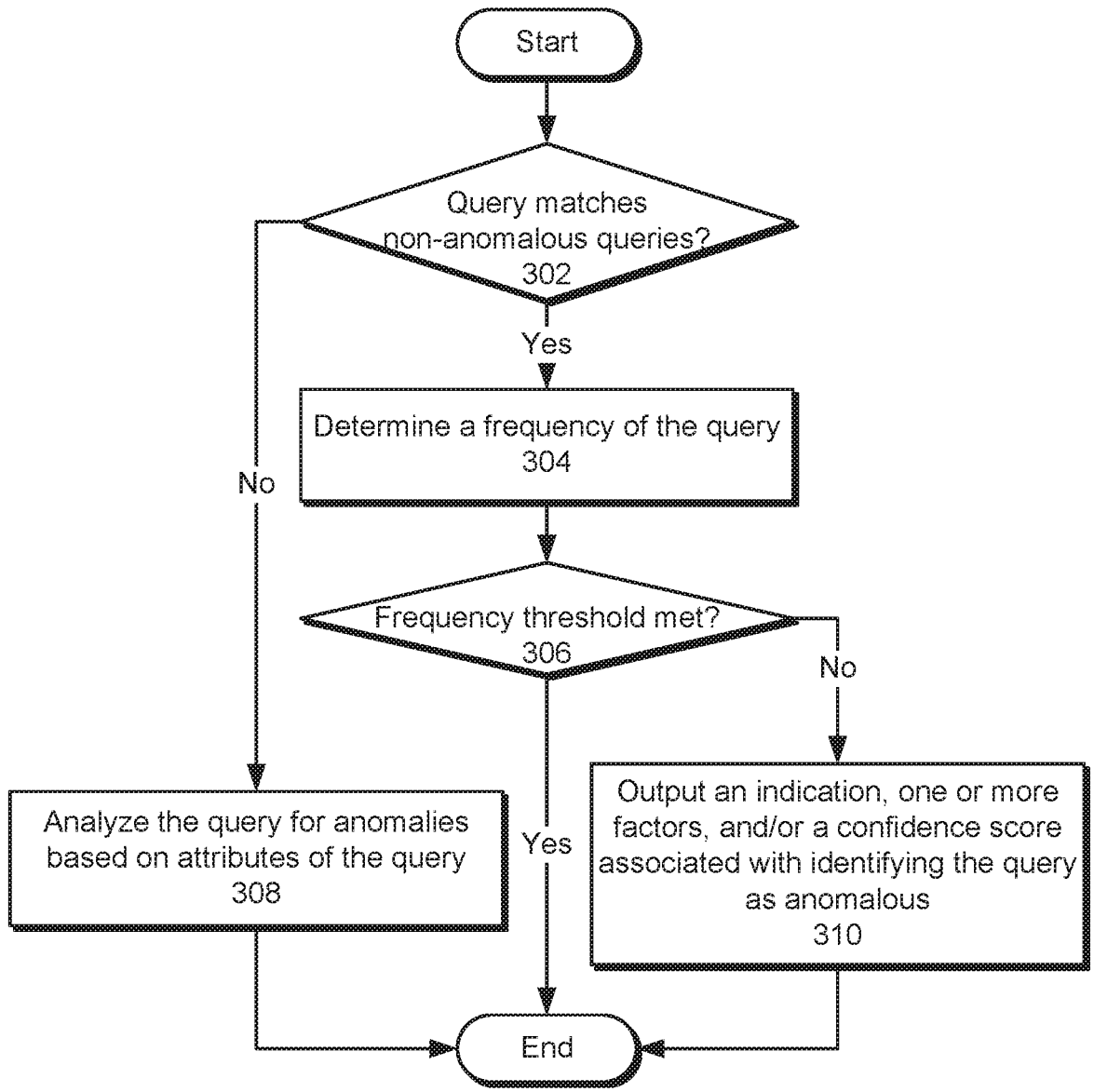
FIG. 3 illustrates a flowchart of performing frequency-based anomaly detection in a relational database query in accordance with one or more embodiments.

FIG. 3 illustrates a flowchart of performing frequency-based anomaly detection in relational database queries in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

First, a query may be matched to one or more non-anomalous queries (operation 302). For example, a checksum may be calculated from the query and compared to a set of corresponding checksums for a set of non-anomalous queries. If the query's checksum matches that of one or more non-anomalous queries, an exact match may be found. If the query does not exactly match any non-anomalous queries (e.g., if the query's checksum is not the same as the checksum of any non-anomalous queries), the query is analyzed for anomalies based on attributes of the query (operation 308), as described in further detail below with respect to FIG. 4.

If the query exactly matches one or more non-anomalous queries, the frequency of the query is determined (operation 304) and compared to a frequency threshold (operation 306). For example, the frequency of the query may be calculated as the number of times the query has occurred over a given period and/or a percentile associated with the frequency in a distribution of query frequencies for the same RDBMS and/or database instance. The frequency may then be compared to a frequency threshold that represents a minimum query frequency for the RDBMS and/or database instance. The frequency threshold may be tuned to reflect a given sensitivity, false positive tolerance, and/or other attribute associated anomaly detection.

If the query's frequency meets the frequency threshold, the query may be identified as non-anomalous, and no additional output and/or analysis related to the query is required. If the query's frequency does not meet the frequency threshold, an anomaly may be identified in the query. In turn, an indication of the anomaly, one or more factors associated with the anomaly, and/or a confidence score associated with identifying the query as anomalous are outputted (operation 310). For example, the anomaly may be included in an alert, notification, email, message, and/or other communication. The communication may also include the frequency of the query as a factor in detecting the anomaly and/or a confidence score that is calculated based on the difference between the query's frequency and the frequency threshold.

6. Attribute-Based Anomaly Detection in Relational Database Queries

Figure 4:
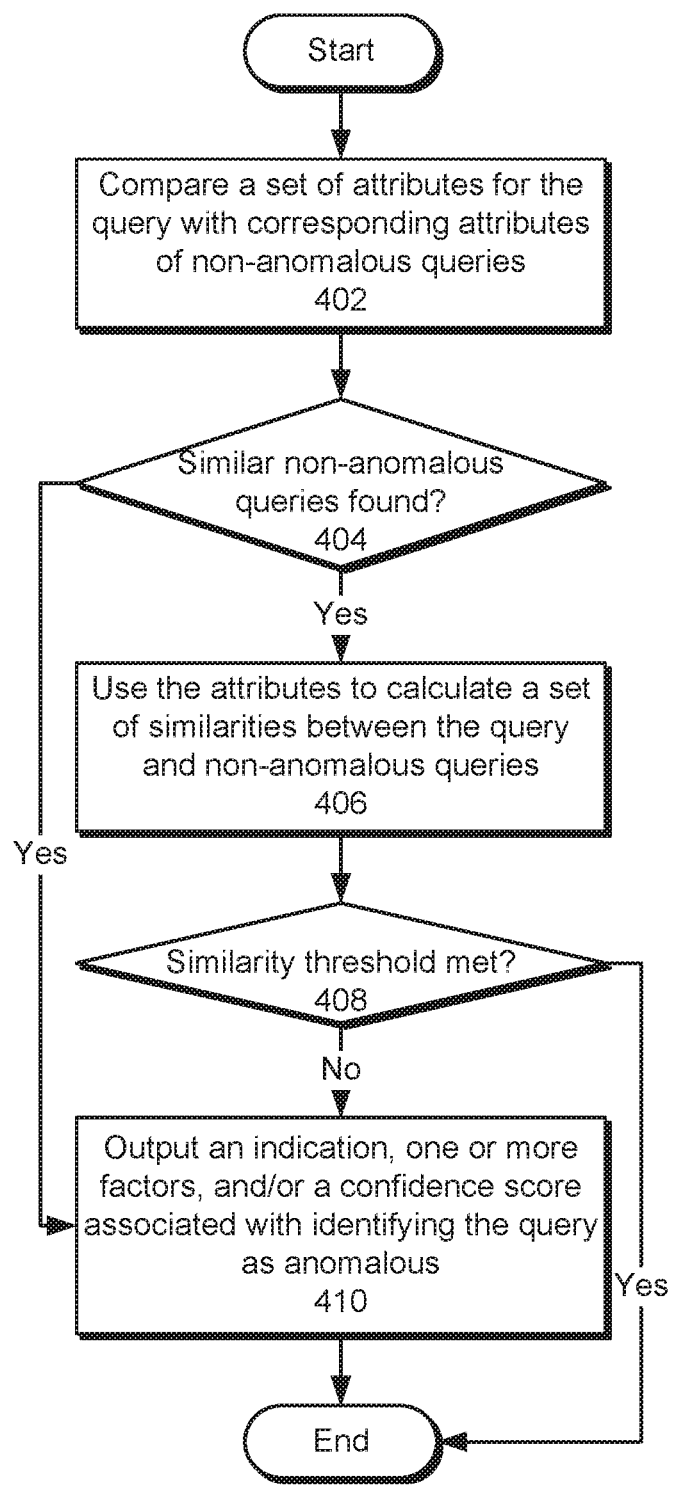
FIG. 4 illustrates a flowchart of performing attribute-based anomaly detection in a relational database query in accordance with one or more embodiments.

FIG. 4 illustrates a flowchart of performing attribute-based anomaly detection in relational database queries in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a set of attributes for a query is compared with corresponding attributes of non-anomalous queries (operation 402) to identify a set of similar non-anomalous queries (operation 404). For example, a locality-sensitive hashing technique may be applied to vector representations of semantic and/or non-semantic attributes of the query to identify a general similarity between the query and a subset of non-anomalous queries.

If similar non-anomalous queries cannot be found for the query, an anomaly may be detected in the query. In turn, an indication of the anomaly may be outputted along with one or more factors and/or a confidence score associated with identifying the query as anomalous (operation 410). For example, the indication may include a factor that indicates that the anomaly was detected based on a lack of similar queries and/or a high confidence score that reflects the lack of similar queries.

If similar non-anomalous queries are found, the attributes are used to calculate a set of similarities between the query and non-anomalous queries (operation 406). For example, a vector representation of attributes in the query may be compared with a vector representation of corresponding attributes in each non-anomalous query to produce an output vector that indicates if a given attribute of the query matches or differs from the corresponding attribute of the non-anomalous query. A set of weights may also be applied to the output vector to generate a scalar similarity score between the query and non-anomalous query.

Similarities calculated between the query and all similar non-anomalous queries are then compared to a similarity threshold (operation 408). If one or more similarities (e.g., the highest similarity from the set of similarities) meet the similarity threshold, no anomaly is found in the query, and no additional output is required. If none of the similarities meet the similarity threshold, an anomaly is found in the query, and an indication of the anomaly may be outputted along with one or more factors and/or a confidence score associated with the anomaly (operation 410). For example, the indication may include a factor that indicates that the anomaly was detected based on a lack of sufficient similarity between the query and similar non-anomalous queries. The factor may additionally identify one or more attributes of the query that differ from the non-anomalous queries. The indication may also, or instead, include a confidence score that is proportional to the difference between the highest similarity and the similarity threshold.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
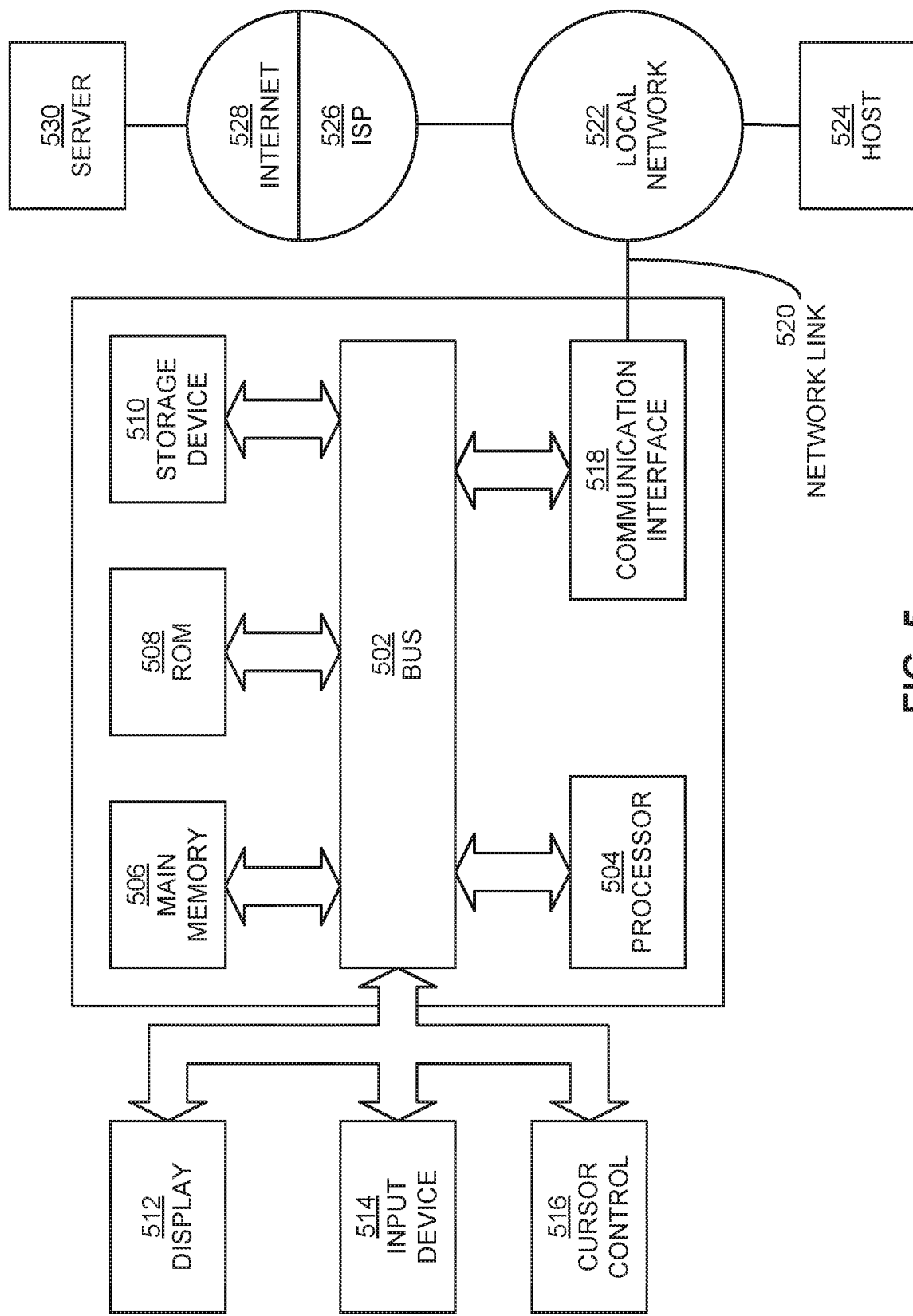
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   obtaining a set of semantic attributes for a query of a relational database;
   mapping a vector representation of the set of semantic attributes to hash buckets in a set of hash tables;
   identifying a general similarity between the query and a set of non-anomalous queries of the relational database based on mappings of vector representations of an additional set of semantic attributes for the set of non-anomalous queries to one or more of the hash buckets;
   calculating a set of similarities between the vector representation of the query and the vector representations of the set of non-anomalous queries of the relational database; and
   when a highest similarity in the set of similarities does not meet a similarity threshold, outputting an indication that the query is anomalous.

2. The medium of claim 1, wherein the operations further comprise:
   when an additional query matches a non-anomalous query in the set of non-anomalous queries and has a frequency that does not meet a frequency threshold, outputting an additional indication that the additional query is anomalous.

3. The medium of claim 2, wherein the frequency threshold comprises a percentile frequency.

4. The medium of claim 1, wherein the operations further comprise:
   when the general similarity is not found between an additional query and any queries in the larger set of non-anomalous queries, outputting an additional indication that the additional query is anomalous.

5. The medium of claim 1, wherein calculating the set of similarities between the vector representation of the query and the vector representations of the set of non-anomalous queries further comprises:
   generating an output vector comprising comparisons of elements in the vector representation of the query with corresponding elements in an additional vector representation of another query in the set of non-anomalous queries; and
   applying a set of weights to the comparisons in the output vector to produce the similarity.

6. The medium of claim 1, wherein the operations further comprise:
   outputting one or more factors associated with identifying the query as anomalous.

7. The medium of claim 1, wherein the operations further comprise:
   calculating, based on a difference between the highest similarity and the similarity threshold, a confidence score associated with identifying the query as anomalous; and
   outputting the confidence score with the indication that the query is anomalous.

8. The medium of claim 1, wherein the operations further comprise:
   obtaining a set of additional attributes for the query; and
   using the additional attributes to calculate the similarity of the query to the set of non-anomalous queries.

9. The medium of claim 8, wherein the set of additional attributes comprises at least one of:
   a time of the query;
   a source of the query;
   a user associated with the query; and
   a privilege.

10. The medium of claim 1, wherein the set of semantic attributes for a data manipulation language (DML) query comprises at least one of:
    a database instance;
    a set of tables;
    a set of columns;
    a number of tokens; and
    a select all option.

11. The medium of claim 1, wherein the set of semantic attributes for a data definition language (DDL) query comprises at least one of:

a database instance;
a grantee;
a granted privilege;
a grant all option; and
a with admin option.

12. A method, comprising:
obtaining a set of semantic attributes for a query of a relational database;
mapping a vector representation of the set of semantic attributes to hash buckets in a set of hash tables;
identifying a general similarity between the query and a set of non-anomalous queries of the relational database based on mappings of vector representations of an additional set of semantic attributes for the set of non-anomalous queries to one or more of the hash buckets;
calculating a set of similarities between the vector representation of the query and the vector representations of the set of non-anomalous queries of the relational database; and
when a highest similarity in the set of similarities does not meet a similarity threshold, outputting an indication that the query is anomalous.

13. The method of claim 12, further comprising:
when an additional query has a frequency that does not meet a frequency threshold, outputting an additional indication that the additional query is anomalous.

14. The method of claim 12, wherein calculating the set of similarities between the vector representation of the query and the vector representations of the set of non-anomalous queries further comprises:
generating an output vector comprising comparisons of elements in the vector representation of the query with corresponding elements in an additional vector representation of another query in the set of non-anomalous queries; and
applying a set of weights to the comparisons in the output vector to produce the similarity.

15. The method of claim 12, further comprising:
obtaining a set of additional attributes for the query; and
using the additional attributes to calculate the similarity of the query to the set of non-anomalous queries.

16. An apparatus, comprising:
one or more processors; and
memory storing instructions that, when executed by the one or more processors, cause the apparatus to:
obtain a set of semantic attributes for a query of a relational database;
map a vector representation of the set of semantic attributes to hash buckets in a set of hash tables;
identify a general similarity between the query and a set of non-anomalous queries of the relational database based on mappings of vector representations of an additional set of semantic attributes for the set of non-anomalous queries to one or more of the hash buckets;
calculate a set of similarities between the vector representation of the query and the vector representations of the set of non-anomalous queries of the relational database; and
when a highest similarity in the set of similarities does not meet a similarity threshold, outputting an indication that the query is anomalous.

17. The medium of claim 1, wherein mapping the vector representation of the set of semantic attributes to the hash buckets in the set of hash tables comprises:
for each hash table in the set of hash tables, calculating dot products of the vector representation and a set of hyperplanes associated with the hash table; and
mapping the vector representation to a hash bucket indexed by the dot products within the hash table.

18. The medium of claim 1, wherein identifying the general similarity between the query and the set of non-anomalous queries of the relational database based on the mappings of vector representations of an additional set of semantic attributes for the set of non-anomalous queries to one or more of the hash buckets comprises:
obtaining the set of non-anomalous queries of the relational database from the one or more of the hash buckets to which the set of non-anomalous queries were previously mapped using the set of hyperplanes.

* * * * *